United States Patent
Richardson et al.

(10) Patent No.: US 10,893,089 B2
(45) Date of Patent: Jan. 12, 2021

(54) SYSTEM AND METHOD FOR CONTROLLING A MOUSE OR CURSOR POSITION IN RESPONSE TO ONE OR MORE INPUT EVENTS FROM A LOCAL COMPUTER AND/OR REMOTE COMPUTER

(71) Applicant: RealVNC Ltd, Cambridge (GB)

(72) Inventors: Tristan J. Richardson, Cambridge (GB); Andrew S. T. Lee, Cambridge (GB); Steven Guest, Cambridge (GB); Jason Barrie Morley, Cambridge (GB)

(73) Assignee: RealVNC Ltd, Cambridge (GB)

( * ) Notice: Subject to any disclaimer, the term of this patent is extended or adjusted under 35 U.S.C. 154(b) by 802 days.

(21) Appl. No.: 14/917,544

(22) PCT Filed: Sep. 12, 2014

(86) PCT No.: PCT/GB2014/052761
§ 371 (c)(1),
(2) Date: Mar. 8, 2016

(87) PCT Pub. No.: WO2015/036766
PCT Pub. Date: Mar. 19, 2015

(65) Prior Publication Data
US 2016/0219095 A1    Jul. 28, 2016

(30) Foreign Application Priority Data

Sep. 13, 2013  (GB) .................................. 1316331.6

(51) Int. Cl.
*H04L 29/08*       (2006.01)
*G06F 9/451*       (2018.01)
(Continued)

(52) U.S. Cl.
CPC ........ *H04L 67/025* (2013.01); *G06F 3/04812* (2013.01); *G06F 3/04842* (2013.01); *G06F 9/452* (2018.02)

(58) Field of Classification Search
CPC .............................. G06F 9/452; H04L 67/025
See application file for complete search history.

(56) References Cited

U.S. PATENT DOCUMENTS

| | | | | |
|---|---|---|---|---|
| 4,101,879 A | * | 7/1978 | Kawaji | G09G 1/007 345/162 |
| 5,654,726 A | * | 8/1997 | Mima | G06F 3/04892 345/2.2 |

(Continued)

FOREIGN PATENT DOCUMENTS

WO    2009140766    11/2009

OTHER PUBLICATIONS

Richardson, et al., Internet Engineering Task Force (IETF), "Remote Framebuffer Protocol" available at https://tools.ietf.org/pdf/rfc6143.pdf (Year: 2011).*

(Continued)

*Primary Examiner* — James T Tsai
(74) *Attorney, Agent, or Firm* — Sheppard, Mullin, Richter & Hampton LLP

(57) ABSTRACT

A method and system for controlling access to a first computing device by a second computing device, said method comprising: detecting whether said first computing device is being used by a local user; receiving an input event for said first computing device, determining whether said received input event is a local input event from said local user or a remote input event from said second computing device; and blocking said received input event if said (Continued)

received input event is determined to be a remote input event and if said first computing device is detected as being used by said local user.

15 Claims, 6 Drawing Sheets

(51) Int. Cl.
G06F 3/0481 (2013.01)
G06F 3/0484 (2013.01)

(56) References Cited

U.S. PATENT DOCUMENTS

| | | | | |
|---|---|---|---|---|
| 5,758,110 | A * | 5/1998 | Boss | G06F 3/0481 715/204 |
| 6,006,282 | A | 12/1999 | Deleeuw et al. | |
| 8,698,741 | B1 * | 4/2014 | Wang | G06F 3/0488 345/157 |
| 8,872,781 | B1 * | 10/2014 | de los Reyes | G06F 3/0383 345/173 |
| 8,910,305 | B1 * | 12/2014 | Rai | G06F 21/55 726/23 |
| 8,994,655 | B2 * | 3/2015 | Komeda | G09G 5/08 345/157 |
| 9,485,290 | B1 * | 11/2016 | Kolomeitsev | H04L 65/4092 |
| 10,073,586 | B2 * | 9/2018 | Huang | G06F 3/04812 |
| 2004/0001044 | A1 * | 1/2004 | Luciani, Jr. | G06F 3/04812 345/157 |
| 2004/0059782 | A1 | 3/2004 | Sivertsen | |
| 2004/0179036 | A1 | 9/2004 | Teplov et al. | |
| 2005/0007344 | A1 * | 1/2005 | Cook | G06F 3/03543 345/163 |
| 2005/0041014 | A1 * | 2/2005 | Slotznick | G06F 3/04812 345/156 |
| 2005/0141127 | A1 * | 6/2005 | Shimotono | G01P 15/0891 360/75 |
| 2007/0085825 | A1 * | 4/2007 | Geffin | G06F 3/038 345/157 |
| 2007/0288640 | A1 * | 12/2007 | Schmieder | G06F 3/0481 709/227 |
| 2008/0201644 | A1 * | 8/2008 | Partani | G06F 3/038 715/740 |
| 2008/0235596 | A1 | 9/2008 | Bhogal et al. | |
| 2009/0128491 | A1 * | 5/2009 | Katayama | G06F 3/038 345/163 |
| 2009/0282359 | A1 | 11/2009 | Saul et al. | |
| 2009/0292999 | A1 * | 11/2009 | LaBine | G06F 3/1454 715/740 |
| 2011/0047240 | A1 * | 2/2011 | Seol | G06F 3/037 709/208 |
| 2012/0011445 | A1 * | 1/2012 | Gilboa | G06F 3/0481 715/740 |
| 2012/0084670 | A1 | 4/2012 | Momchilov | |
| 2014/0002361 | A1 * | 1/2014 | Ballard | G06F 3/03543 345/163 |
| 2014/0160022 | A1 * | 6/2014 | Stewart | G06F 1/169 345/160 |

OTHER PUBLICATIONS

Remote Desktop Environments Reflected in Local Desktop Windows ip.com Disclosure No. IPCOM000104191D Original Publication Date: Mar. 1, 1993 Included in the Prior Art Database: Mar. 18, 2005 (Year: 1993).*
Great Britain Patent Application No. GB1316331.6, Search Report dated Feb. 17, 2014.
International Application No. PCT/GB2014/052761, International Search Report and Written Opinion dated Jan. 9, 2015.

* cited by examiner

SYSTEM AND METHOD FOR CONTROLLING A MOUSE OR CURSOR POSITION IN RESPONSE TO ONE OR MORE INPUT EVENTS FROM A LOCAL COMPUTER AND/OR REMOTE COMPUTER

CROSS-REFERENCE TO RELATED APPLICATIONS

This application is a national stage application pursuant to 35 U.S.C. § 371 of International Application No. PCT/GB2014/052761, filed Sep. 12, 2014, which claims priority to Great Britain Patent Application No. 1316331.6, filed Sep. 13, 2013, the disclosures of which are hereby incorporated by reference herein.

FIELD OF THE INVENTION

The present invention relates to a system and method for controlling access to a computer, and in particular for controlling remote access to a computer.

BACKGROUND TO THE INVENTION

It is known to use a first computer device to remotely view and control a second computer device using a Virtual Network Computing (VNC) viewer application running on the first computer device (VNC viewer) and a VNC server application running on the second computer device (VNC server). The contents of the display of the second computer device are duplicated on the first computer device, which is typically remote from the second computer device. The first computer device has an interface mechanism which allows the user to send user input events, such as pressing a physical key on the device or moving the mouse cursor, to the second computer device being controlled. As will be appreciated, the form of data link and the nature of the computer devices can vary depending on the situation the system is used in.

Such a system allows one or more remote users to access a GUI desktop, which in some cases is also being accessed by a local user with physical access to the computer. Current implementations of VNC and similar remote desktop access systems intentionally provide little in the way of arbitration for input events. Accordingly, unpleasant side effects, such as unintended activation of GUI elements may occur. For example, mouse movement by the local user while a remote user has a mouse button pressed on most systems may result in an unintentional mouse drag operation.

One way to control access to a computing device is by using keyboard, video and mouse switches (KVM switches) with remote access, or reverse KVM switches (such as the 2-port dual Omniview access KVM switch sold by Belkin with product number F1D201 http://www.belkinbusiness-.com/ca/products/f1d201). KVM switches are physical devices which allow a user to control multiple computers from one or more keyboard, video monitor and mouse, and may feature "auto-switching technology". The KVM switches plug into the back of a computing device and emulate real keyboard and mouse hardware. The auto-switching technology allows the KVM switches to detect input from multiple physical keyboards and prioritise one over the other/s. The KVM switches operate by intercepting input signals from hardware before it arrives at the computing device.

The present system and method provide a mechanism to control access to a computer by a remote user when the computer is also being accessed by a local user.

SUMMARY OF THE INVENTION

According to a first aspect of the invention, there is provided a method for controlling access to a first computing device by a second computing device, as set out in appended independent claim 1.

According to another aspect of the invention, there is provided a method for controlling access to a first computing device by a second computing device, said method comprising:
  detecting whether said first computing device is being used by a local user;
  receiving an input event for said first computing device, determining whether said received input event is a local input event from said local user or a remote input event from said second computing device; and
  blocking said received input event if said received input event is determined to be a remote input event and if said first computing device is detected as being used by said local user.

The blocking step effectively transfers control of the first computing device to the local user and this transfer of control is automatic rather than controlled by the user of either the first or second computing device. The blocking is preferably only initiated if the two conditions specified are met. If local use is detected but the input event is determined to be a local input event rather than a remote input event, no blocking is generally imposed. Accordingly, the input event will be injected into the first computing device so that the input event is implemented on the first computing device. If there is no local use detected, no blocking is also generally imposed. Accordingly, either a remote input event or a local input event may be injected into the first computing device. It will be appreciated that injecting a local input event leads to local use which will be detected on the next iteration of the method. In this way, local user access to the first computing device is prioritised.

An input event may be any command from a user on a user input device of the first or second computing devices. Typically user input devices include (but are not limited to) a keyboard, a mouse, a touch sensitive screen or any other mechanism for allowing a user to input commands. The first and second computing devices typically comprise a display showing a user the result of the input command. In some instances, the input events result in movement of a cursor on the display, e.g. by moving a mouse or by using arrow keys on a keyboard or a touch sensitive keypad.

Typically, the steps of said method will be carried out by a processor on the first computing device. However, it is possible that the method may be carried out by a processor on the second computing device or even jointly by both computing devices. The method is thus a computer implemented method running on a processor of one or both of the computing devices.

According to a second aspect of the invention, there is provided a first computing device which is connectable to a second computing device as set out in appended independent claim 13.

According to another aspect of the invention, there is provided a first computing device which is connectable to a second computing device and which is configured to control access by said second computing device, said first computing device comprising:
  a connection for connecting to said second computing device;
  an input interface for receiving remote input events from said second computing device;

an input interface for receiving local input events from a user of said first computing device and a processor which is configured to detect whether said first computing device is being used by said local user;

determine whether a received input event is a local input event from said local user or a remote input event from said second computing device; and block said received input event if said received input event is determined to be a remote input event and if said first computing device is detected as being used by said local user.

The following features apply to all aspects of the invention. The method or steps at the processor may be implemented in a software module which may be termed an input arbitration module. In this way, the system and method is designed to run without using existing or additional hardware to intercept signals (i.e. input events). As explained below, the system and method may also be designed to run without requiring the privileges needed to monitor, intercept and suppress input signals coming into the operating system of the first computing device at a low level.

In addition to blocking said input events, if said first computing device is detected as being used by said local user, any previously received remote input events may also be negated. For example, any key or mouse button presses (or indeed any other relevant input state) from remote users may be released. This prevents the most unpleasant side effects of two users simultaneously pressing keys or a mouse button, such as unintended activation of GUI elements. For example, mouse movement by the local user while a remote user has a mouse button pressed on most systems will results in an unintentional mouse drag operation. Overwriting or releasing the remote input events which are still active prevents this.

If said first computing device is detected as being used by said local user, remote input events are preferably blocked for a pre-set time period. The pre-set time period may be short, e.g. one second.

Said detecting step may be repeated at regular intervals, e.g. every few milliseconds. The regular interval is preferably shorter than the pre-set time period. Otherwise, there is the risk that the block on the remote user will be lifted and he will be able to input events even though the local user is using the local device. In other words, the local user is not prioritised as desired.

Transfer of control of the local device is automatic, and in order for users of the system (both remote and local) to know whether they can use the system (input events), the system preferably provides feedback or notification of the current state of the system.

Thus, a remote user of said second computing device and/or a local user of said first computing device may be notified when said remote input events are blocked and/or when said block is lifted. The notification method may be visual or aural or a combination of visual and aural alerts.

Determining whether or not an input event is a remote or a local input event may be done by determining which device sent the input event.

There are various methods for detecting whether said first computing device is being used by a local user. Detecting may comprise hooking into the operating system (OS) of the first computing device at a low level and intercepting keyboard and mouse events. However, whilst this is the most reliable way to detect local activity, this may not be possible because of privilege issues and malware detection at the first computing device. Thus a less invasive approach is preferred.

Detecting whether said first computing device is being used by a local user may comprise determining whether said local user is moving the cursor or mouse. In this embodiment, said input event is a mouse or cursor input event which corresponds to movement of a mouse or cursor from a first position on a display of the first computing device to a second position on said display. Said detecting step may comprise receiving a position of the mouse or cursor on the display of the first computing device; comparing said received position with an expected position of the mouse or cursor and detecting that said first computing device is being used by a local user if said received position does not match said expected position. Said position may be received by polling said first computing device (i.e. polling the operating system) for the position of the mouse at regular interval. Alternatively, said position may be received each time said operating system of first computing device changes the position.

It is necessary to be able to distinguish when a change in cursor position is the result of local as opposed to remote input. One way for achieving this, is that said expected position may be determined by maintaining a current position for said mouse or cursor. Said current position may be updated after each detecting step with the received position when said received position does not match said expected position. Said current position may also be updated after each determining step when the input event is determined to be a remote input event. In this circumstance, said current position may be updated with the position to which the remote input event moves said mouse or cursor. This position may be determined by calculating the position of the mouse or cursor from the current position and the effect of the remote input event. Alternatively, e.g. for relative input events, this position may be querying the first computing device for the position of the mouse after the remote input event has been injected.

Said first computing device comprises at least one display and said method comprising defining an operative area of said at least one display. The first computing device may comprise a plurality of displays which may have different sizes and/or different resolutions. If a bounding box is defined as the outermost boundary of these displays, there may be dead spots (i.e. areas in which there is no display) within the bounding box. Accordingly, the operative area may be a complex shape within the bounding box to ensure that the dead spots are excluded. When said input event is determined to be a remote input event, said remote input event may be constrained to take effect only in the operative area of said at least one display. In other words, if it is determined that the effect of the remote input event will take the cursor position outside the operative area, the cursor position is forced to a position within the operative area. Alternatively, any remote input events which result in the cursor position falling outside the operative area may simply be blocked. The advantages of such blocking may prevent a "false positive" when detecting whether or not there is any local activity. For example, when an input event is injected which would move the cursor or mouse position to a "dead spot", some systems do not update the cursor position instantly but move the position later. Accordingly, a subsequent querying to determine whether or not there is local activity, finds that the cursor position does not match the expected position and thus it is incorrectly determined that there is local activity.

The method and system may also regulate access to the first computing device by more than one computing device, for example to prioritise an admin user of the second computing device over a guest user working on the third computing device. This may comprise detecting whether said first computing device is being used by said second computing device; receiving an input event for said first computing device, determining whether said received input event is an input event from said second computing device or from said third computing device; and blocking said received input event if said received input event is determined to be an input from said third computing device and if said first computing device is detected as being used by said second computing device. As previously, the blocking is only implemented if both conditions are met and thus input events are permitted if both conditions are not met.

This feature could be used in conjunction with the first aspect of the invention so that the local user is prioritised over the user of the second computing device but the user of the second computing device is prioritised over the user of the third computing device. Alternatively, input between remote users may be effectively prioritised without consideration of the local user.

According to another aspect of the invention, there is provided a method for controlling access to a first computing device by a second computing device and a third computing device, said method comprising:
  detecting whether said first computing device is being used by said second computing device;
  receiving an input event for said first computing device,
  determining whether said received input event is an input event from said second computing device or from said third computing device; and
  blocking said received input event if said received input event is determined to be an input from said third computing device and if said first computing device is detected as being used by said second computing device.

In the above embodiments, the local user is prioritised over the remote user. However, it is possible to reverse the implementation so that remote users are prioritised over the local user.

According to another aspect of the invention, there is provided a method for controlling access to a first computing device by a second computing device, said method comprising:
  detecting whether said first computing device is being used by said second computing device;
  receiving an input event for said first computing device,
  determining whether said received input event is a local input event from said local user or a remote input event from said second computing device; and
  blocking said received input event if said received input event is determined to be a local input event and if said first computing device is detected as being used by said second computing device.

However, this would usually require extra privileges and tighter integration with the operating system of the local user's device.

In each of the above embodiments, the first computing device may be a local computing device and the second (and third) computing device may be a remote computing device. By remote, it is meant that the two devices are physically remote from each other. The devices may be located a considerable distance away from each other or may be located close by (e.g. both within the same building). The computing devices may be any computing terminal, for example desktops, PCs and servers, as well as portable devices such as mobile phones, PDAs, laptops, tablets and similar devices.

According to another aspect of the invention, there is provided a system comprising a first computing device as described above and a second computing device connected to said first computing device.

The invention further provides processor control code to implement the above-described systems and methods, for example on a general purpose computer system or on a digital signal processor (DSP). The code may be provided on a carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

The invention is diagrammatically illustrated, by way of example, in the accompanying drawings, in which.

DETAILED DESCRIPTION OF PREFERRED EMBODIMENTS

As mentioned above, Virtual Network Computing (VNC) allows a remote user using a computing device to view and control another computing device. This is achieved using a viewer application running on one computing device (VNC Viewer) and a VNC server application running on the other computing device (VNC Server). The two devices are typically remote from one another, i.e. physically separated, and thus one computing device may be termed a local device and a second computing device may be termed a remote device. However, prior art implementations of VNC and similar remote desktop access systems do not provide means to deal with input events from both remote and local users. Typically, the VNC server will give exclusive access to any user who presses a key or mouse button. This does not take into account that another user may be moving the mouse. Thus, the key/mouse press combined with mouse movement will result in an unintentional mouse drag operation on most operating systems. However, suppressing local mouse input is beyond the scope of most VNC server implementations.

In situations where the remote and local users have a high degree of trust in one another, these interaction problems are a minor inconvenience. However, where a local user has a lower level of trust in the remote user, it becomes extremely important that the local user can override the remote user when it becomes apparent that the remote user may be malicious. Embodiments of the present invention relate to a system that allows local input to be prioritised over remote input with a minimum of support from the underlying operating system's desktop display/windowing system.

Figure 1:
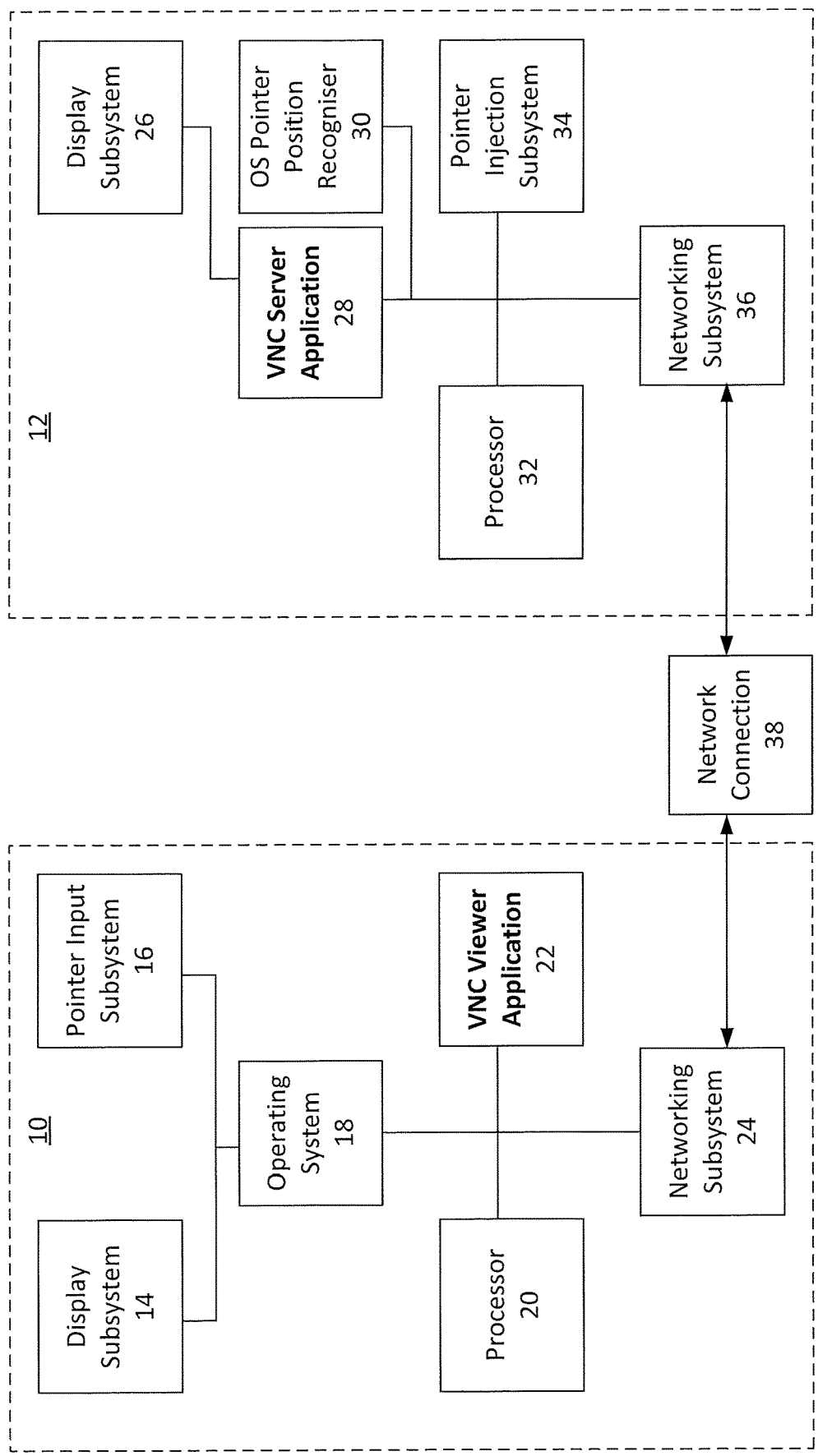
FIG. 1 is a block diagram showing the components of a remote control system according to the invention.

FIG. 1 shows various components of a remote control system comprising a remote computing device 10 which is connected via a network connection 38 to a local device 12 (physical machine). The local device 12 comprises a processor 32 (e.g. a microprocessor), a display 26 and a networking subsystem 36 connected to the network connection 38. The remote device 10 comprises a processor 20 (e.g. a microprocessor), a display 14, an operating system 18 and a networking subsystem 24 that is connected to the network connection 38.

A VNC viewer application 22 is running on the remote device 12 to receive an image of the local device display via the networking subsystem 24 and output it on the remote device display subsystem 14. A pointer input subsystem 16 running on the remote device 10 is configured to determine movements of the cursor by the remote user and communicate them to the local device for processing.

As explained in more detail below, a corresponding VNC server application 28 is running on the local device 12 to query the system's cursor/pointer (mouse) position. The local device 12 further comprises a pointer injection subsystem 34 and an operating system pointer recogniser 30. The VNC server application 28 is configured to process movements of the cursor by the remote user (received from the pointer input subsystem 16) using the pointer recogniser 30, and to inject the cursor position into the operating system using the pointer injection subsystem 34. The VNC server application 28 does this by making the appropriate API call that causes the operating system to move the mouse pointer, and then immediately querying the operating system for the current position of the cursor.

Figure 2:
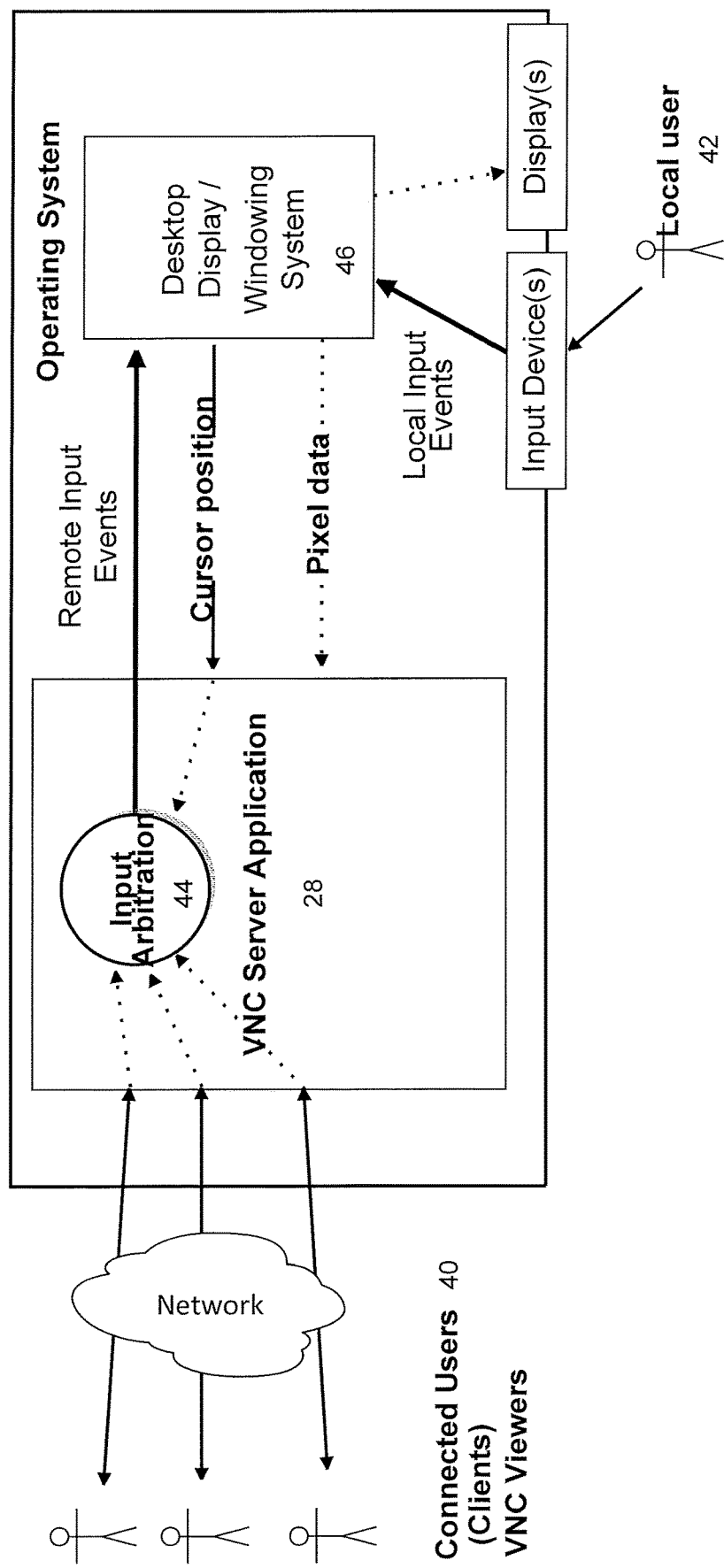
FIG. 2 is a high-level block diagram showing components of the system.

FIG. 2 is a high-level block diagram illustrating the key features of the system. One or more users 40 (clients) are able to use the VNC Viewer application on their computing device to connect to a VNC server application 28 on the device of a local user 42. As shown the connection is via a network but the connection could alternatively be via a physically wired connection or a short range radio communication system, such as Wi-Fi or Bluetooth™. The VNC server application 28 comprises an input arbitration module 44 which is configured to arbitrate input events in order to prioritise one user over another (e.g. a local user over a remote user). As depicted, the input arbitration module 44 sits within the VNC server application 28. However, it will be appreciated that the functionality may be achieved using two separate modules or a single integrated module.

The VNC server application 28 receives remote input events from the connected users and these are passed to the input arbitration module 44. It will be appreciated that the remote input events may be received direct at the input arbitration module 44. If the received remote input event relates to movement of the mouse/cursor of the local device, the event may be injected into the operating system of the local computing device subject to the processing of the input arbitration module 44 described in more detail below. Such remote input events may trigger changes to the display of the local user device and thus as shown the changes may be sent from the desktop display/windowing system 46 to the display(s). Substantially immediately afterwards, the VNC server application 28 queries the desktop display/windowing system 46 of the local device for the current position of the cursor. The current cursor position is fed-back to the VNC server application 28, and this position is saved as the expected cursor position.

The VNC server application 28 may also be configured to receive pixel data from the desktop display/windowing system 46 of the local computing device. The pixel data may be sent to provide an image of the display on the local computing device to the remote computing device. The pixel data may also relate to the resolution of the local computing device and may allow the VNC server application to determine where the cursor position can be positioned. This is described in more detail below with respect to FIG. 7.

Local input events are sent from the input device(s) of the local user to the desktop display/windowing system 46. The input arbitration module may be configured to detect when there is local input. As explained in more detail below, when local input has been detected, the system may be configured to release any key or mouse button presses (or indeed any other relevant input state) from remote users and to disallow/block remote input for a short time period (e.g. one second). This prevents unwanted mouse drag operations such as thus described in the background section.

The input arbitration module may optionally be configured to prioritise input between remote users. For example, an admin user may be prioritised over a guest user.

The input arbitration module may also optionally be configured to prioritise remote users over the local user. However, this would usually require extra privileges and tighter integration with the operating system of the local user's device.

Figure 3:
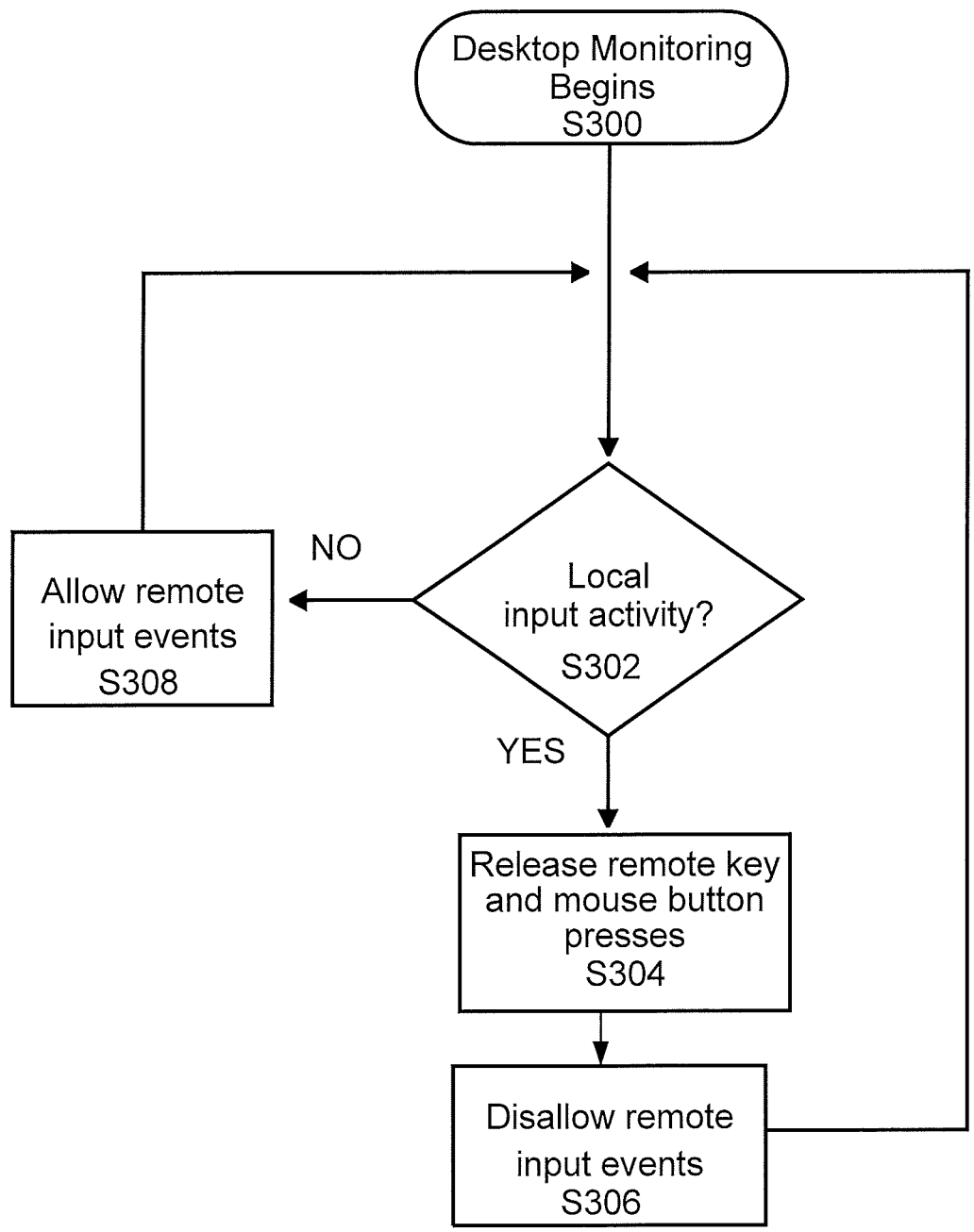
FIG. 3 is flowchart illustrating a method for controlling remote access to the system of FIG. 2.

FIG. 3 depicts a flowchart showing the basic process of prioritising a local user over a remote user. The steps may be carried out by an input arbitration module. Once desktop monitoring is begun (step S300), a higher-level application programming interface (API) or similar is used to detect local input activity (S302) at regular intervals, as described in more detail below. If no local input activity is detected, remote users are able to input keyboard and mouse events (S308) which take effect on the local user's device, before the next check for local input activity. When local input activity is detected, remote keyboard and/or mouse button presses (S304) are released, i.e. any existing remote inputs which may affect how a local user uses the local device are removed or cancelled. In addition, new inputs (e.g. keyboard or mouse button presses) from the remote user are temporarily disallowed or blocked (S306). The block is generally for a short time period, e.g. for one second. The system then returns to the step of monitoring local input activity.

Detecting local user activity can be done in a number of ways. The most reliable way is to hook into the operating system (OS) of the local user's device at a low level and intercept keyboard and mouse events. However, there are several reasons this may not be possible. For example, the VNC server application may not be running with sufficient privilege to accomplish this. Alternatively, on some systems it may not even be possible and even where it is possible, it may require a complex OS-specific component to be written. Doing so can also increase the chances of the VNC server software being detected as malware by anti-virus programs.

Embodiments of the present invention typically use a less invasive approach to determine whether a local or a remote user is moving the cursor, i.e. by using a higher-level API to query the cursor position on the local device. Such APIs are likely to be available on almost any system. The cursor position can be tracked either by polling at a suitable rate (e.g. every few hundred milliseconds), or if possible by being notified by the operating system when the cursor position changes.

Figure 4:
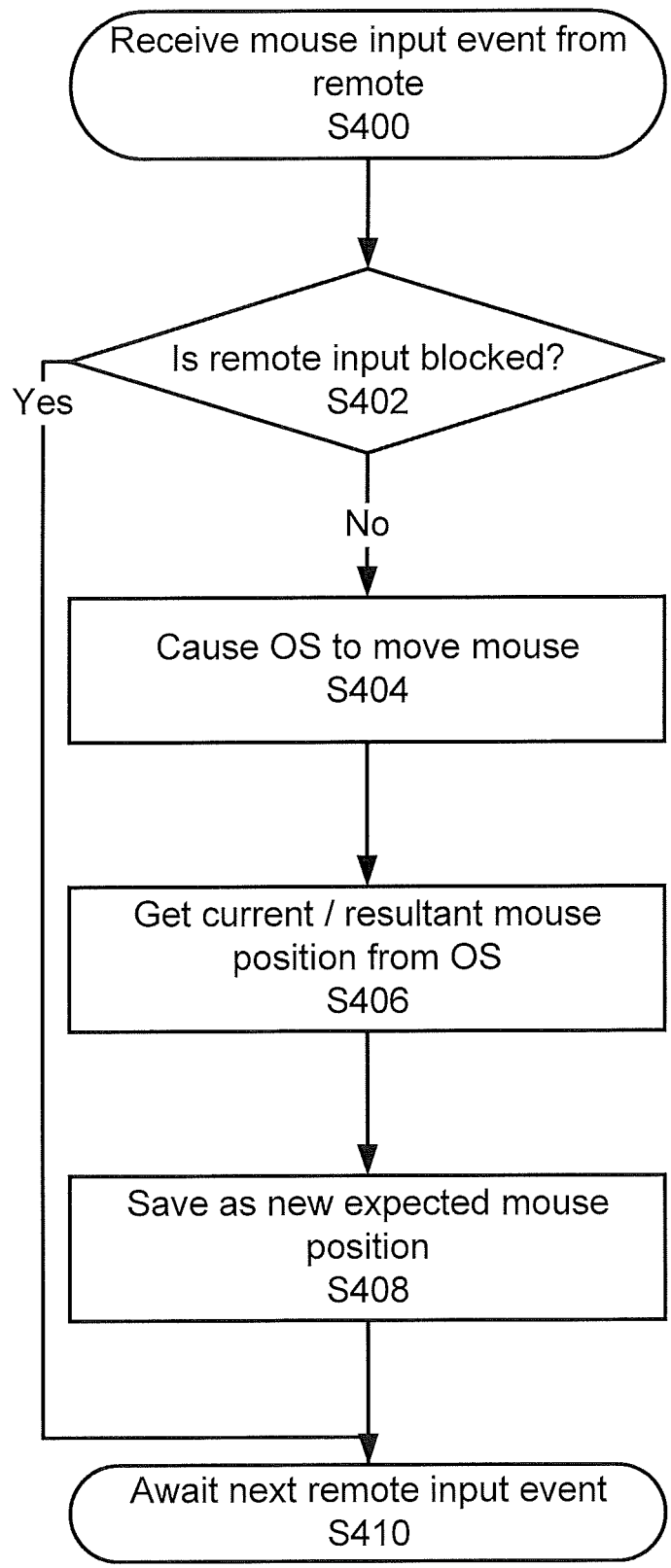
FIG. 4 is a flowchart illustrating how a new remote input is acted upon according to an embodiment of the invention.

As mentioned briefly above, the pointer input subsystem 16 running on the remote device 10 is configured to determine movements of the cursor by the remote user and communicate them to the local device 12 for processing. The VNC server application 28 running on the local device 12 is configured to receive these remote input events and to process and inject cursor movements made by the remote user into the operating system of the local device. FIG. 4 outlines the procedure implemented by the VNC server application or more specifically, its input arbitration module, to process remote user cursor movements. The VNC server application receives a mouse/cursor or similar remote input event from a remote device (step S400). The VNC server application checks if remote input is blocked (S402). If remote input is blocked, the procedure moves straight to step S410 to await the next remote input event.

If remote input is permitted, the VNC server application makes the appropriate API call to cause the operating system to move the cursor (S404) and display the new position of the cursor on the display subsystem 26. Substantially immediately after the cursor is moved, the VNC server application queries the operating system to obtain the current cursor position (S406), and saves the current cursor position as the new expected/saved cursor position (S408). Once the cursor position has been updated and saved, the VNC server application awaits the next remote cursor input event (S410). Each time a remote cursor event is received, the VNC server application repeats steps S402 to S408 and, if appropriate, updates the expected cursor position to the new cursor position received from the remote device.

As mentioned above, the operating system may be polled at a fast rate (e.g. once every few hundred milliseconds). A fast polling rate minimises the time between moving the mouse and querying the current cursor position. This advantageously avoids problems that may arise if the mouse is moved by the local user between the two events (i.e. between step S404 and S406). For many operating system versions, it is possible to move the mouse and get an updated mouse position with an infinitesimally small delay, so that the current cursor position is received substantially immediately after the cursor is moved.

FIG. 4 sets out the procedure to deal with incoming remote input events. However, in preferred embodiments, the system is also configured to determine if a local user is moving a mouse and consequently, to determine whether the remote user is to be blocked. It is therefore necessary to be able to distinguish when a change in cursor position is the result of local as opposed to remote input.

Figure 5:
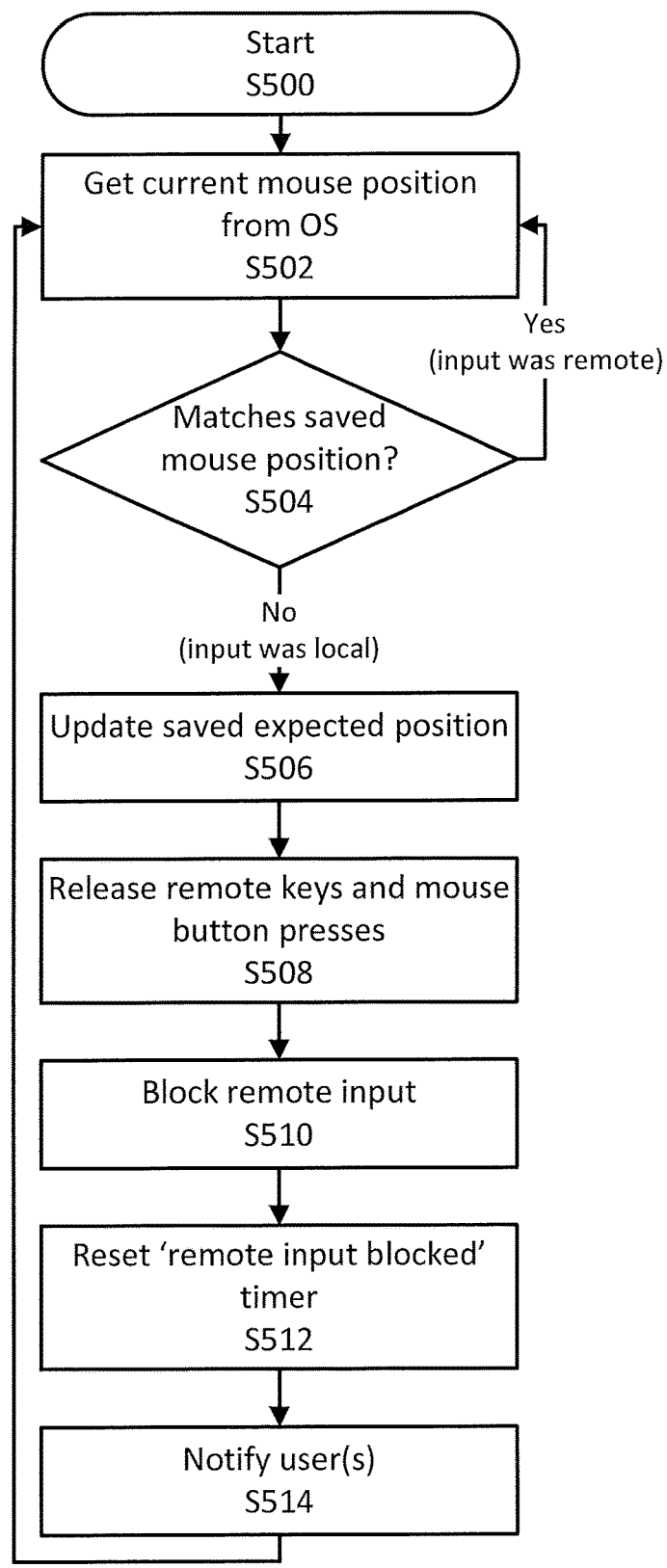
FIG. 5 is a flowchart illustrating how to determine if a input to the system is local or remote.

FIG. 5 shows a flowchart of the procedure to determine whether the monitored input is local or remote. The VNC server application obtains the position of the cursor at start-up (S500) and saves this as the saved/expected position. The cursor/mouse position is obtained from the operating system (S502), e.g. via an operating system pointer position recogniser 30 running on the local device 12. The next step is to track the cursor position by checking if the current cursor/mouse position matches the saved/expected position (step S504). If the positions match, this is indicative of remote input because the VNC server application updates the saved/expected position each time the remote user moves the cursor (see above with respect to FIG. 4). In this case, the procedure returns to query the current mouse position.

If the positions do not match, the cursor/mouse is determined to have been moved by the local user. In this case, the saved/expected position is updated (S506) to the current detected cursor position. As the local user is determined to be using the mouse, to avoid unintentional mouse drag actions, any buttons or keys pressed by the remote user are released (S508) and the remote user is blocked from moving the mouse and pressing any keys/buttons temporarily (step S510). Once a timer set to the specific time duration of the block reaches zero, the timer is reset (step S512) and the remote user is unblocked. The procedure notifies users of the system (both remote and local) of the block imposed on the remote user (S514). The procedure then loops back to polling the OS for the mouse position.

Figure 6:
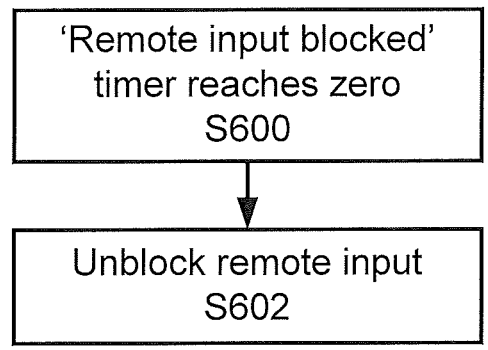
FIG. 6 is a flowchart showing how remote input is unblocked.

FIG. 6 shows the steps to unblock a remote user. Once a block is imposed, a 'remote input blocked' timer counts down the duration of the block. When the timer reaches zero (S600), the remote user is unblocked (S602). Notification may also be given to users of when the block is lifted. Typically, a remote user is blocked for a short period, e.g. a second, which is greater that the time period for polling the position of the cursor/mouse, e.g. a few millisecond. If the polling time is less frequent than the block out time, there is the risk that the block on the remote user will be lifted and he will be able to input events even though the local user is using the local device. In other words, the local user is not prioritised as desired.

For each of the above embodiments, there are two types of cursor/pointer (mouse) input events (remote and local). "Absolute events" specify absolute coordinates on the screen (i.e. the X and Y positions) to which the cursor should be moved. "Relative events" specify a delta (change) in the X and Y positions/coordinates, where the delta indicates by how much the cursor should be moved in each direction from the saved position. The units used for relative events are conventionally called "mickeys".

In simple systems, the mickeys may map directly to pixels on the display(s)/monitor(s). The system counts the number of "mickeys" received from the mouse and will move the cursor by that number of pixels. However, more typically, a mouse acceleration algorithm may be running on the operating system. The acceleration algorithm detects the mouse movement speed, and causes the operating system to move the cursor at a speed proportional to the mouse movement speed. However, as the mouse movement speed increases, the accuracy of the corresponding cursor position may decrease. In addition, many operating systems have a complex relationship between relative mouse movement and the cursor position. Thus, in certain cases, if the mouse event is a "relative event", it may not be possible to know precisely where the cursor will end up as a result of the event. Accordingly, after the event has been injected, the operating system may be polled for the cursor position and this is used as the updated position.

Figure 7:
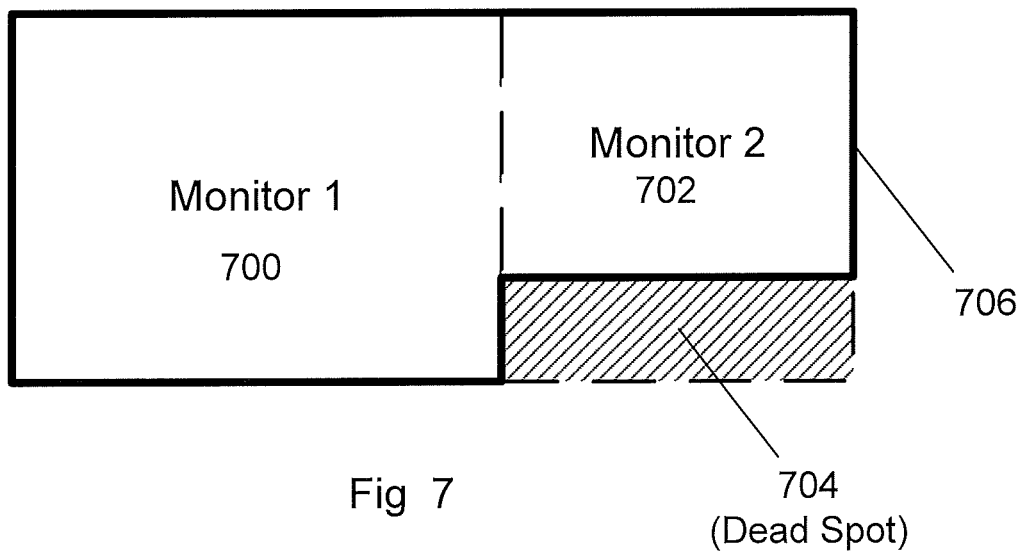
FIG. 7 shows an example of a "virtual desktop" created by the VNC server that relates to physical monitors.

Even when the mouse event is an absolute event and specifies an absolute position to which the cursor should be moved, it may not be possible to guarantee that the operating system will position the cursor as specified. For example, if the local computing device is a multi-monitor system with monitors of differing resolutions, the specified cursor position may actually be located in a "dead spot" outside any actual monitor. FIG. 7 illustrates an example of such a multi-monitor computing device, comprising one monitor 700 with a particular resolution and a second monitor 702 with a different resolution. The smallest rectangular box drawn around the peripheries of the two screens including the operative areas of both screens together with a deadspot area 704 in which there is no screen. The operating system running on the local device has complete knowledge of the individual monitor geometry and will not allow a cursor (or mouse) to be positioned in the dead spot 704. However, the operating system running on the remote device has no such knowledge and may thus send an instruction to move the mouse (and hence the cursor) into a dead spot because it is not aware that such a dead spot exists.

This is addressed by the VNC server application, particularly the input arbitration module, defining a "virtual desktop" to which remote input events may be applied. As shown in FIG. 7, the virtual desktop defines an operative area 706 within which the mouse position lies. In this case, the operative area is a complex shape which represents the limits of the actual physical monitors and thus is defined by a solid line around three sides of the smaller monitor 702 (i.e. all sides except the one adjacent the larger monitor) and three sides of the larger monitor together with part of the fourth side which is adjacent the other monitor. In this way, the virtual desktop does not include the dead spot 704 where there is no physical monitor.

Some operating systems have also been observed not to update the cursor position instantly after the VNC server application has injected a remote mouse event into a dead spot on the local device. As a result of the delay in moving the cursor, a subsequent query of the cursor position appears to show local mouse movement. This gives rise to a 'false positive'—i.e. at step S504 shown in FIG. 5, there is no match and thus an incorrect conclusion that the local user is moving the mouse which leads to blocks the remote user. This can be avoided by confining the remote input event to a position which lies within the bounds of an actual physical monitor. For example, after step S400, in FIG. 4, a determination could be made as to whether or not the remote input event will move the mouse to a dead spot. If the remote input event will result in a dead spot position, the remote input event may be rejected or altered to ensure that the position is within the correct area, e.g. within the operative area of FIG. 7. Alternatively, such false positives can be avoided by, for example, increasing the time between a cursor event being injected and the operating system being queried for the current cursor position to account for the delay in updating the position. Alternatively, a history of injected cursor positions may be kept and any positions that do not correspond to one that was injected may be flagged.

Figure 8:
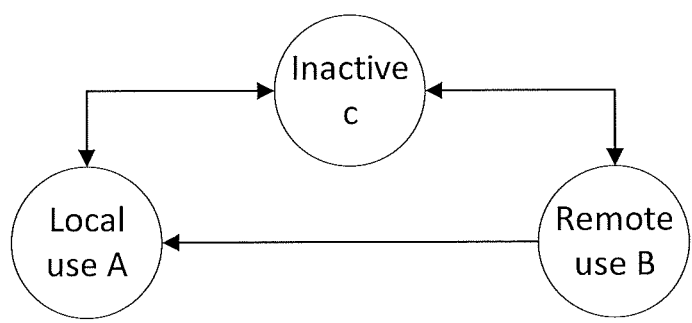
FIG. 8 is a state diagram for the system.

As described above, the system is able to identify whether the local or a remote user is using a computing device and to control access of the users to the device. FIG. 8 is a state diagram showing the three control states in the system:

A. The local user is using the desktop (detected via local mouse and keyboard activity);
B. Remote user is using the desktop (detected via input event messages received from the a remote viewer); and
C. The desktop is inactive.

When a VNC session begins it is in control state C, and the local user and any remote user can access the desktop. Accordingly, the system can change from control state C to either state A or B depending on whether the local user or a remote user inputs an event (e.g. a key press or mouse movement).

In control state A, the local user has sole access to the desktop and any input events sent by remote users are rejected. The system moves out of control state A and moves back to control state once the local user has stopped using the device for more than a determined period (e.g. a second). If this state transition occurs, the block on the remote user is lifted. However, the system can never move directly from control state A to control state B.

In control state B, the remote user has access to the desktop but the local user can pre-empt an existing interaction between a remote user and the shared desktop (i.e. can block the remote user) and the session enters into state A. The system can also change from control state B to control state C if the desktop is inactive for a period (e.g. no remote user input events for a second).

Transfer of control of the local device is automatic, and in order for users of the system (both remote and local) to know whether they can use the system (input events), the system provides feedback or notification of the current state of the system. For example, as mentioned above, users may be notified of a block imposed on the remote user and when the block is lifted. The notification method may be visual, i.e. a graphical change on the display, such as a pictorial icon indicating whether a user is blocked or not, or a change in the user name displayed in a status bar (indicating which user, local or remote, is currently using the system). The notification method may be aural, e.g. a sound alert is played to indicate when a user is blocked/unblocked. The notification method may be a combination of visual and aural alerts.

In embodiments, one colour is used to indicate that a local user is active or the desktop is inactive (control states A and C), and another colour is used to indicate that the remote user is active (control state B). The system may alert the local user to remote user activity by employing a suitable mapping where the colour red may be associated with remote user activity, and the colour green may be associated with local user activity and inactivity. This colouring scheme is adopted by the local user's server UI.

In embodiments, one icon or visual state can be used to indicate that the local user is active (control state A), and another icon or visual state can be used to indicate that a remote user is active or is able to access the desktop (control states B and C). Remote users can also be notified when they are blocked from inputting events, by displaying an interstitial icon on the remote user's display/GUI desktop for the duration of the block.

Alternatively or additionally, the system may use any of the following techniques to notify the remote user that a block is in place and they cannot input events:

(a) Changing the 'form' or shape of the cursor displayed on the screen of the remote device to indicate that no input is permitted, for example by changing the conventional arrow shape to a 'no entry'-shaped cursor;
(b) Greying out the VNC viewer screen when remote input is not permitted;
(c) Sounding an alert tone if the remote user tries to type at the VNC Viewer end (i.e. on the remote device), while remote input is not permitted.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of controlling access to a local computing device by a remote computing device, the method comprising:

saving a current local position of a mouse or cursor as an expected position;
repeatedly determining whether the local computing device is being used by a local user;
receiving a remote input event from remote computing device, wherein the remote input event is a mouse or cursor event which corresponds to movement of the mouse or cursor from a first position on a display of the local computing device;
if the local computing device is determined as being used by the local user, blocking the remote input event;
if the local computing device is not determined as being used by local user, updating the current local position of the mouse or cursor with a second position to which the remote input event moves the mouse or cursor; and
after the updating, saving the current local position as the expected position; and
wherein determining whether the local computing device is being used by a local user comprises:
receiving the current local position of the mouse or cursor on the display of the local computing device;
comparing the received current local position with the expected position;
and based on the comparing, determining that the local computing device is being used by the local user when the received current local position does not match the expected position and determining that the local computing device is not being used by the local user when the received current local position does match the expected position.

2. A method as claimed in claim 1, further comprising saving the received current local position as the expected position when received current local position does not match the expected position.

3. A method as claimed in claim 1, further comprising, if the local computing device is detected as being used by the local user, negating any previously received remote events.

4. A method as claimed in claim 1, further comprising if the local computing device is detected as being used by the local user, blocking remote events for a pre-set time period.

5. A method as claimed in claim 1, further comprising notifying a remote user of the remote computing device when the remote events are blocked.

6. A method as claimed in claim 1, wherein the repeatedly detecting includes repeatedly detecting at regular intervals.

7. A method as claimed in claim 1, wherein the local computing device comprises at least one display and the method further comprises defining an operative area of the at least one display.

8. A method as claimed in claim 7, the remote event is constrained to take effect only in the operative area of the at least one display.

9. A method as claimed in claim 7, comprising blocking remote events which result in effects outside the operative area of the at least one display.

10. A local computing device which is connectable to a remote computing device and which is configured to control access by the remote computing device, the local computing device comprising:
a connection for connecting to the remote computing device;
an input interface for receiving remote input events from the remote computing device;
an input interface for receiving local input events from a local user of the local computing device, wherein the input event is a mouse or cursor event which corresponds to movement of a mouse or cursor from a first position on a display of the local computing device; and
a processor which is configured to:
save a current local position of the mouse or cursor as an expected position;
repeatedly determine whether the local computing device is being used by the local user;
if the local computing device is determined to be being used by the local user, block the remote input events; and
if the local computing device is not determined to be being used by the local user, update the current local position of the mouse or cursor with a second position to which the remote input event moves the mouse or cursor; and
after the update, save the current local position as the expected position;
wherein determining whether the local computing device is being used by a local user comprises:
receiving the current local position of the mouse or cursor on the display of the local computing device;
comparing the received current local position with the expected position; and
based on said comparing, determining that the local computing device is being used by a local user if the received current local position does not match the expected position, and determining that the local computing device is not being used by the local user when the received current local position does match the expected position.

11. A system comprising the local computing device as claimed in claim 10 and the remote computing device connected to the local computing device.

12. A non-transitory carrier carrying code which when implemented on a processor of a local computing device, causes the processor to carry out the steps of:
saving a current local position of a mouse or cursor as an expected position;
repeatedly detecting determine whether the local computing device is being used by a local user;
receive a remote input event for the local computing device, wherein the remote input event is a mouse or cursor event which corresponds to movement of the mouse or cursor from a local position on a display of the local computing device;
if the local computing device is determined to be being used by the local user, block the input event; and
if the local computing device is not determined to be being used by the local user, updating a current local position of the mouse or cursor with the second position to which the remote input event moves the mouse or cursor; and
after the updating, saving the current local position as the expected position;
wherein determining whether the local computing device is being used by a local user comprises:
receiving the current local position of the mouse or cursor on the display of the local computing device;
comparing the received current local position with the expected position; and
based on the comparing, determining that the local computing device is being used by the local user when the received current local position does not match the expected position, and determining that the local computing device is not being used by the local user when the received current local position does match the expected position.

13. A non-transitory carrier as claimed in claim 12, wherein the code further causes the processor to carry out the step of updating the expected position when the received current local position does not match the expected position.

14. A non-transitory carrier as claimed in claim 12, wherein if the local computing device is detected as being used by the local user, the code further causes the processor to carry out the step of negating any previously received remote events.

15. A non-transitory carrier as claimed in claim 12, wherein if the local computing device is detected as being used by the local user, the code further causes the processor to carry out the step of blocking remote events for a pre-set time period.

\* \* \* \* \*

UNITED STATES PATENT AND TRADEMARK OFFICE
CERTIFICATE OF CORRECTION

| | | |
|---|---|---|
| PATENT NO. | : 10,893,089 B2 | Page 1 of 1 |
| APPLICATION NO. | : 14/917544 | |
| DATED | : January 12, 2021 | |
| INVENTOR(S) | : Tristan J. Richardson et al. | |

It is certified that error appears in the above-identified patent and that said Letters Patent is hereby corrected as shown below:

In the Claims

Claim 1, Column 12, Line 66:
"receiving a remote input event from remote computing"
Should read:
--receiving a remote input event from the remote computing--

Claim 1, Column 13, Line 8:
"used by local user, updating the current local position"
Should read:
--used by the local user, updating the current local position--

Claim 2, Column 13, Line 29:
"position when received current location position does not match"
Should read:
--position when the received current location position does not match--

Claim 12, Column 14, Line 33:
"saving a current local position of a mouse or cursor as an"
Should read:
--save a current local position of a mouse or cursor as an--

Claim 12, Column 14, Line 35:
"repeatedly detecting determine whether the local comput-"
Should read:
--repeatedly determine whether the local comput- --

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*